(No Model.)
J. GÉRARD.
PINCHERS.
No. 483,550. Patented Oct. 4, 1892.
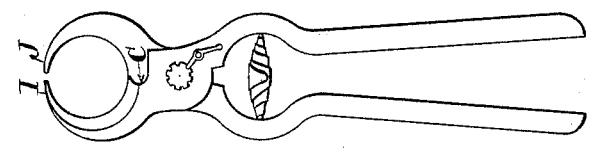
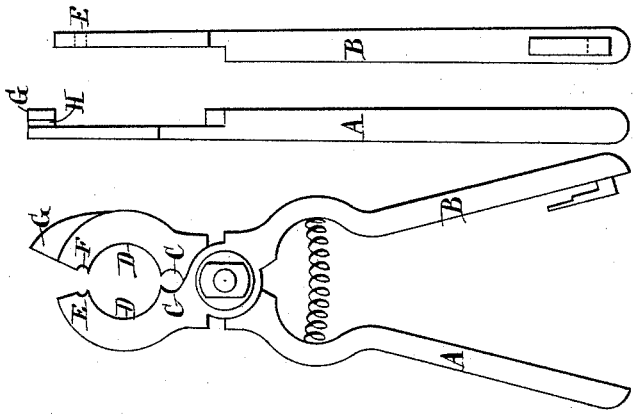
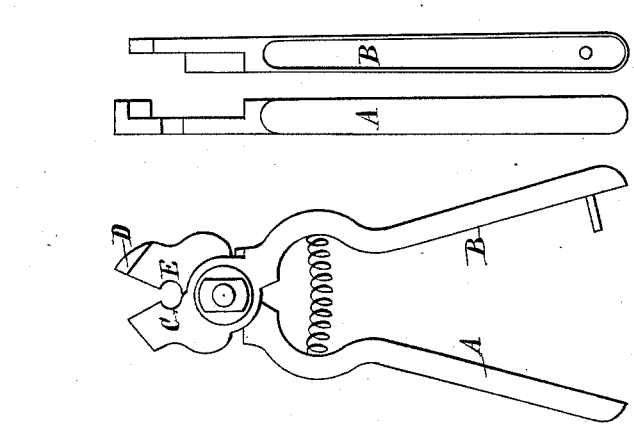
Witnesses:
E. B. Bolton
E. K. Sturtevant
Inventor:
Joseph Gérard
By Richards
his Attorneys.

UNITED STATES PATENT OFFICE.

JOSEPH GÉRARD, OF DÔLE, FRANCE.

PINCHERS.

SPECIFICATION forming part of Letters Patent No. 483,550, dated October 4, 1892.

Application filed July 9, 1892. Serial No. 439,554. (No model.) Patented in France April 22, 1891, No. 212,893.

*To all whom it may concern:*

Be it known that I, JOSEPH GÉRARD, of Dôle, France, have invented certain new and useful Improvements in Pinchers, (patented in France April 22, 1891, No. 212,893,) of which the following is a full, clear, and exact description.

The subject of this invention is an improvement in pinchers especially adapted for the cutting of wire and uncorking of wine-bottles.

In order to make my invention more clearly understood, I have shown in the accompanying drawings a means for carrying the same into practical effect.

Referring to the drawings, Figure 1 is a view of a pair of pinchers embodying my invention. Figs. 2 and 3 are side views of the handles A and B, respectively. Fig. 4 is a view of a slightly-different form of pinchers. Figs. 5 and 6 are side views of the handles thereof. Fig. 7 is a modification of Fig. 4.

In the drawings (see Fig. 1) the pinchers are made in two parts jointed together and connected by a screw-bolt. The handles A and B are hollow. Notches C represent the blades. The blade D is cut in the shape of a point at the extremity and, passing over the point E, serves to cut the wire.

Referring to Fig. 4, the blades G serve to cut the wire, the parts D, which are concave and sharp, serve to cut the cords which surround the cork, and the end E, crossing on the end F, forms shears and cuts the wire.

To prevent the spreading of the blades, the blade F has its extremity G turned over, forming an opening or groove H, in which the blade E engages.

Fig. 7 represents the same instrument as Fig. 4, with the difference that the extremities I J are rounded off without crossing one on the other.

I reserve the right to use solid or riveted blades with solid or hollow handles.

I claim—

1. In combination, in a cutting implement, the two members pivoted together and having cutting-blades C and the semicircular extensions beyond the same, the said semicircular parts having cutting-edges also, substantially as described.

2. In combination, the two members pivoted together and having blades C C, the semicircular extensions beyond the said blades, and the cutters E F at the other ends of the semicircular extensions, substantially as described.

3. In combination, the two members having the cutters C C, the semicircular extensions, the cutters G, carried thereby, one of said extensions being grooved to receive the other, substantially as described.

In testimony that I claim the foregoing I have hereunto set my hand this 29th day of November, 1891.

JOSEPH GÉRARD.

Witnesses:
 VICTOR MATRAX,
 JOSEPH SALING.